(12) United States Patent
Hasegawa (10) Patent No.: US 12,551,902 B2
(45) Date of Patent: Feb. 17, 2026

(54) ELECTROSTATIC PRECIPITATOR

(71) Applicant: Creative Technology Corporation, Kawasaki (JP)

(72) Inventor: Takaaki Hasegawa, Kawasaki (JP)

(73) Assignee: Creative Technology Corporation, Kawasaki (JP)

( * ) Notice: Subject to any disclaimer, the term of this patent is extended or adjusted under 35 U.S.C. 154(b) by 703 days.

(21) Appl. No.: 17/788,795

(22) PCT Filed: Nov. 30, 2020

(86) PCT No.: PCT/JP2020/044523
§ 371 (c)(1),
(2) Date: Jun. 24, 2022

(87) PCT Pub. No.: WO2021/131519
PCT Pub. Date: Jul. 1, 2021

(65) Prior Publication Data
US 2023/0046930 A1 Feb. 16, 2023

(30) Foreign Application Priority Data

Dec. 27, 2019 (JP) .................................. 2019-239850

(51) Int. Cl.
*B03C 3/41* (2006.01)
*B03C 3/04* (2006.01)
(Continued)

(52) U.S. Cl.
CPC .................. *B03C 3/41* (2013.01); *B03C 3/04* (2013.01); *B03C 3/47* (2013.01); *B03C 3/64* (2013.01);
(Continued)

(58) Field of Classification Search
CPC .... B03C 3/41; B03C 3/04; B03C 3/47; B03C 3/64; B03C 3/70; B03C 2201/06;
(Continued)

(56) References Cited

U.S. PATENT DOCUMENTS 4,643,745 A 2/1987 Sakakibara
4,673,416 A 6/1987 Sakakibara
(Continued)

FOREIGN PATENT DOCUMENTS

CN 1842374 A 10/2006
CN 101115564 A 1/2008
(Continued)

OTHER PUBLICATIONS

European Search Report dated Jan. 2, 2024 for European Patent Application No. 20908122.3.
(Continued)

*Primary Examiner* — Jennifer Dieterle
*Assistant Examiner* — Phillip Y Shao
(74) *Attorney, Agent, or Firm* — Fishman Stewart PLLC (57) ABSTRACT

An electrostatic precipitator is disclosed. The electrostatic precipitator includes an ionization unit configured to generate ions and a dust collection unit configured to electrically collect dust to which the ions are attached. The ionization unit is an ionizer that applies a predetermined voltage to an electrode needle to cause a corona discharge to generate the ions having the same polarity as a polarity of the applied voltage. The dust collection unit includes a high-voltage electrode disposed having a plurality of gaps for passing the dust to which the ions are attached, and a dust collection board disposed at a rear stage of the high-voltage electrode. A polarity of the voltage applied to the electrode needle of the ionization unit and the polarity of the voltage applied to the high-voltage electrode are set to the same polarity.

18 Claims, 6 Drawing Sheets

(51) Int. Cl.
  *B03C 3/47* (2006.01)
  *B03C 3/64* (2006.01)
  *B03C 3/70* (2006.01)
  *H01T 19/04* (2006.01)

(52) U.S. Cl.
  CPC ............... *B03C 3/70* (2013.01); *H01T 19/04* (2013.01); *B03C 2201/06* (2013.01)

(58) Field of Classification Search
  CPC ......... B03C 3/60; B03C 2201/10; B03C 3/12; H01T 19/04; Y02A 50/2351
  See application file for complete search history.

(56) References Cited

U.S. PATENT DOCUMENTS

| | | | |
|---|---|---|---|
| 5,055,963 A | | 10/1991 | Partridge |
| 5,474,600 A | * | 12/1995 | Volodina ................... B03C 3/38 96/99 |
| 7,465,339 B2 | | 12/2008 | Tanaka |
| 10,537,901 B2 | | 1/2020 | Lee |
| 2003/0005824 A1 | | 1/2003 | Katou |
| 2004/0129140 A1 | * | 7/2004 | Park ........................ B03C 3/155 96/66 |
| 2009/0120781 A1 | | 5/2009 | Motegi |
| 2012/0000627 A1 | | 1/2012 | Jewell-Larsen |
| 2012/0312170 A1 | * | 12/2012 | Noh ......................... B03C 3/86 96/100 |
| 2017/0203305 A1 | | 7/2017 | Lee |
| 2017/0341087 A1 | * | 11/2017 | Yuge ..................... A47L 9/1683 |

FOREIGN PATENT DOCUMENTS

| | | |
|---|---|---|
| GB | 1559629 A | 1/1980 |
| JP | H0229385 B1 | 6/1990 |
| JP | H07256145 A | 10/1995 |
| JP | H0871451 A | 3/1996 |
| JP | H09253525 A | 9/1997 |
| JP | 2003320274 A | 11/2003 |
| KR | 20160006062 A | 1/2016 |
| WO | 2016068702 A1 | 5/2016 |

OTHER PUBLICATIONS

Taiwanese Office Action dated Dec. 26, 2023 for Taiwanese Patent Application No. 109144511.
International Search Report dated Jan. 8, 2020 for International Application No. PCT/JP2020/044523.
Chinese Office Action dated Jul. 4, 2024 for Chinese Patent Application No. 202080090304.5.
Korean Notice of Submission of Opinion dated Dec. 5, 2025 for KR10-2022-7020821.

* cited by examiner

ELECTROSTATIC PRECIPITATOR

CROSS-REFERENCE TO RELATED APPLICATIONS

This application claims priority to International Patent Application No. PCT/JP2020/044523 filed Nov. 30, 2020, which also claims priority to Japanese Patent Application No. JP 2019-239850 filed Dec. 27, 2019, the contents of each of which is hereby incorporated by reference in its entirety.

TECHNICAL FIELD

The present invention relates to an electrostatic precipitator that collects dust in air by using an electric field.

BACKGROUND

At a manufacturing site, a device that collects dust only for a part of processes, that is, a device that locally collects dust in air, is desired.

Generally, as a technical means for removing dust in air, an air purifier using a filter or an electrostatic precipitator using an electric field is present.

An electrostatic precipitator includes a one-stage electrostatic precipitator and a two-stage electrostatic precipitator.

As described in Patent Literature 1 and Patent Literature 2, a one-stage electrostatic precipitator has a structure in which dust in air is directly collected on a dust collection board by using an ionization unit as a high-voltage electrode and the dust collection board as a counter electrode.

Therefore, a one-stage electrostatic precipitator is often adopted as a small and thin electrostatic precipitator because of having a simple structure and being able to collect dust without power.

Meanwhile, as described in Patent Literature 3 and Patent Literature 4, a two-stage electrostatic precipitator has a structure divided into two stages of an ionization unit configured to charge dust, and a dust collection unit including a high-voltage electrode and a dust collection board configured to collect the dust charged by an electric field.

In particular, the electrostatic precipitators described in Patent Literature 3 and Patent Literature 4 adopt a technique in which the dust collection board or the high-voltage electrode is made of a semi-insulating material to prevent a decrease in a dust collecting efficiency due to a spark discharge.

Patent Literature 1: Japanese Published examined patent application No. H02-029385 B2.
Patent Literature 2: Japanese Published unexamined patent application No. H07-256145 A.
Patent Literature 3: Japanese Published unexamined patent application No. H08-071451 A.
Patent Literature 4: Japanese Published unexamined patent application No. H09-253525 A.

However, the above-described electrostatic precipitators in the prior art have the following problems.

The one-stage electrostatic precipitator disclosed in Patent Literature 1 can obtain a spread of an electric field, but has a drawback that a Coulomb force is weakened because a source of the electric field is far away. Accordingly, with such a weak Coulomb force, the dust that can be collected is limited to small dust. In addition, with the weak Coulomb force, it is difficult to strongly retain the dust on the dust collection board, and the dust may be peeled off by wind or the like. Therefore, there is a problem that the air is polluted again by the peeled off dust.

In addition, in the one-stage electrostatic precipitator disclosed in Patent Literature 2, a strong electric field can be obtained, but generation of the electric field is limited between a discharge electrode and the dust collection board. Therefore, there is a problem that ions are immediately attracted to the dust collection board, the ions do not spread sufficiently, and a dust collection range is narrow.

That is, both the above-described one-stage electrostatic precipitators have a problem that effective dust collection cannot be performed because the dust collection range is narrow and a dust collection capability is low.

Meanwhile, compared with a one-stage electrostatic precipitator, a two-stage electrostatic precipitator has a wider dust collection range and extremely higher dust collection capability, but it is necessary to separately provide an ionization unit and a dust collection unit in order to prevent a spark discharge. Therefore, it is necessary to have a power to drive these units, and it is necessary to include other units such as an ozone treatment device and linearly connect devices such as the ionization unit. As a result, in the two-stage electrostatic precipitator, the equipment itself becomes large, and this two-stage electrostatic precipitator cannot be used as a local dust collector for only a part of processes.

The present invention has been made to solve the above-described problems, and an object of the present invention is to provide an electrostatic precipitator having a wide dust collection range, a high dust collection capability, and being able to be miniaturized and thinned.

SUMMARY

In order to solve the above-described problems, a first invention is an electrostatic precipitator comprising an ionization unit configured to generate ions and a dust collection unit configured to electrically collect dust to which the ions are attached, in which the ionization unit is an ionizer that applies a predetermined voltage to an electrode needle to cause a corona discharge to generate the ions having the same polarity as a polarity of the applied voltage, the dust collection unit includes a high-voltage electrode disposed at a rear stage of the ionization unit, having a plurality of gaps for passing the dust to which the ions are attached, and applied with a predetermined voltage, and a dust collection board disposed at a rear stage of the high-voltage electrode and applied with a voltage having a polarity opposite to a polarity of the voltage applied to the high-voltage electrode to electrically adsorb the dust to which the ions are attached, a polarity of the voltage applied to the electrode needle of the ionization unit and the polarity of the voltage applied to the high-voltage electrode are set to the same polarity, and the high-voltage electrode of the dust collection unit is covered with an insulator, and the dust collection board is covered with an insulator separate from the insulator.

According to such a configuration, when the predetermined voltages of the same polarity are applied to the ionization unit and the high-voltage electrode, and the predetermined voltage of the opposite polarity is applied to the dust collection board, the corona discharge occurs in the ionization unit, and a large quantity of the ions having the same polarity as the applied voltage are generated from the ionization unit. In this case, the voltage having the same polarity as the ions is applied to the high-voltage electrode disposed in the rear stage of the ionization unit, and thus, the large quantity of the ions are repelled by the high-voltage electrode, and movement to a dust collection board side is prevented. That is, the high-voltage electrode having the same polarity as the ions are interposed between the ionization unit and the dust collection board, and prevents an electric field from being created directly between the ionization unit and the dust collection board. Accordingly, the large quantity of the ions diffuse widely in front of the high-voltage electrode without facing the dust collection board side, and adhere to the dust in a wide range. As a result, the wide range of the dust is charged.

After passing through the gaps of the high-voltage electrode, the charged dust is drawn to the dust collection board side by a strong electric field generated between the high-voltage electrode and the dust collection board, and is electrically adsorbed to the dust collection board. That is, the electrostatic precipitator of the present invention has a capability to charge the dust in a wide range and efficiently collect a large quantity of the charged dust by the strong electric field.

By the way, if a distance between the ionization unit and the dust collection board is short, a spark discharge may occur and ozone may be generated. Moreover, since an energy that should be donated to generation of the ions is used for the spark discharge, a dust collection efficiency may be lowered.

However, in the electrostatic precipitator of the present invention, as described above, the high-voltage electrode is interposed between the ionization unit and the dust collection board, and the polarity of the voltage applied to the ionization unit and the polarity of the voltage applied to the high-voltage electrode are set to be the same, and thus, the electric field is not directly generated between the ionization unit and the dust collection board. Therefore, almost no spark discharge occurs. Moreover, since the high-voltage electrode and the dust collection board are covered with the insulators, the occurrence of the spark discharge can be reliably prevented.

A second invention has a configuration in which in the electrostatic precipitator described in the first invention, the high-voltage electrode of the dust collection unit is formed by a plurality of linear conductors arranged in parallel at a predetermined interval and each coated with an insulator, and the dust collection board of the dust collection unit is formed by a flat conductor coated with an insulating resin film.

According to such a configuration, by forming the high-voltage electrode with the plurality of linear conductors arranged in parallel and coated with the insulators, the generation of the electric field between the ionization unit and the high-voltage electrode can be prevented and a strong electric field between the high-voltage electrode and the dust collection board can be generated, and moreover, the charged dust can be reliably passed and smoothly moved to the dust collection board side. By forming the dust collection board with a structure in which the conductor is covered with the insulating resin film, an effect of preventing the spark discharge can be enhanced.

A third invention has a configuration in which in the electrostatic precipitator described in the second invention, a volume resistivity of the resin film is set in a range of $10^{10}$ $\Omega \cdot cm$ to $10^{13}$ $\Omega \cdot cm$, a thickness thereof is set to about 0.1 mm, and the distance from the ionization unit to the dust collection board of the dust collection unit is set to 100 mm or less.

A fourth invention has a configuration in which in the electrostatic precipitator described in the second invention or the third invention, a distance between the plurality of linear conductors forming the high-voltage electrode is set within a range of 40 mm to 100 mm, a distance between the high-voltage electrode formed by the plurality of linear conductors and the dust collection board is set within a range of 10 mm to 80 mm, and a distance from the electrode needle of the ionization unit to the dust collection board of the dust collection unit is set within a range of 30 mm to 100 mm.

A fifth invention has a configuration in which in the electrostatic precipitator described in the second invention to the fourth invention, the ionizer is a direct current ionizer that generates ions by applying a direct current voltage, and the voltages applied to the high-voltage electrode and the dust collection board are direct current voltages having opposite polarities.

As described in detail above, according to the electrostatic precipitator of the present invention, a wide range of dust can be charged and the large quantity of the charged dust can be collected with the strong electric field. Further, by setting the voltage polarity of the high-voltage electrode and the ionization unit to the same polarity and covering the high voltage electrode and the dust collection board with the insulators, the occurrence of the spark discharge can be reliably prevented, and thus, a device such as an ozone treatment device becomes unnecessary, and the entire device can be miniaturized and thinned. That is, the electrostatic precipitator of the present invention has an excellent effect that a wide dust collection range and a high dust collection capability can be secured, and moreover, miniaturization and thinning can be realized.

According to the second invention, the dust collection capability and an effect of preventing the spark discharge can be further enhanced.

According to the third and fourth inventions, the device can be further miniaturized and thinned.

DETAILED DESCRIPTION

Hereinafter, embodiments of the present invention will be described with reference to the drawings.

First Embodiment

Figure 1:
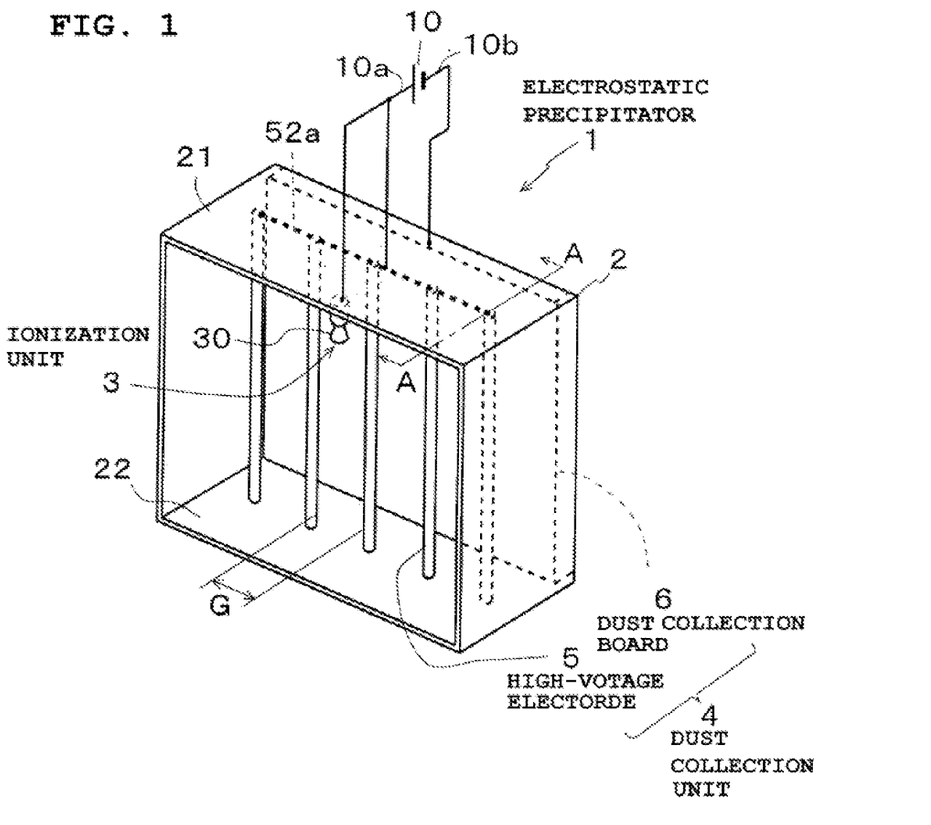
FIG. 1 is a perspective view showing an electrostatic precipitator according to a first embodiment of the present invention.
Figure 2:
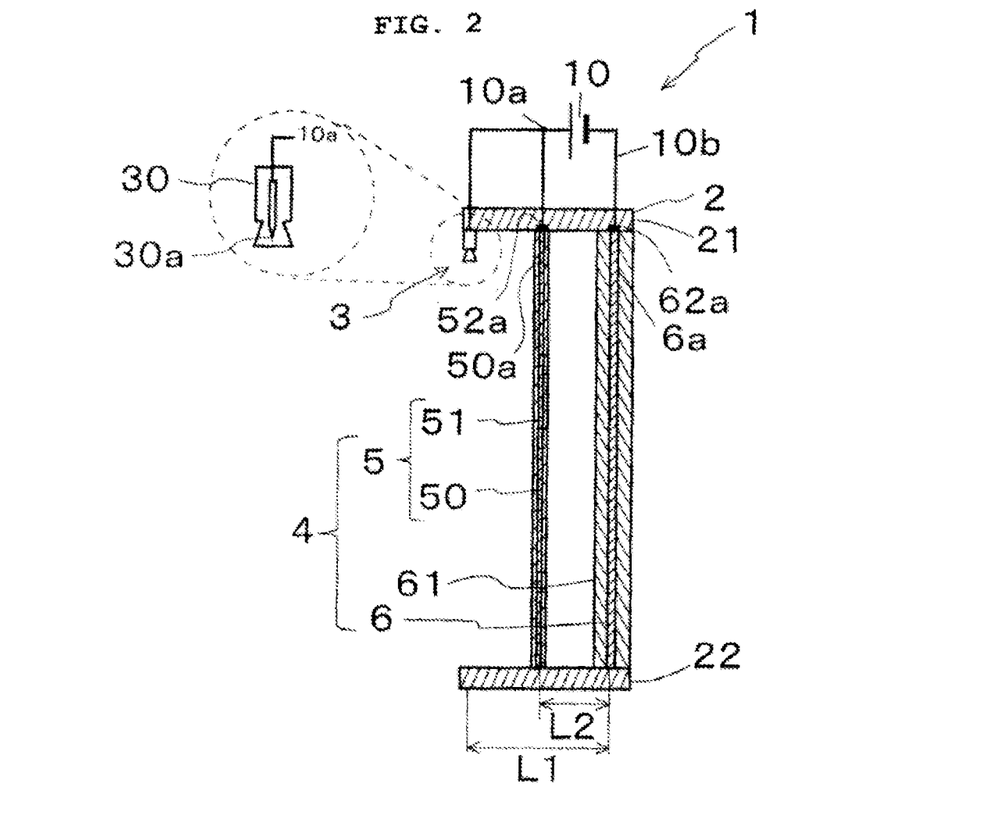
FIG. 2 is a cross-sectional view taken along an arrow A-A in FIG. 1.
Figure 3:
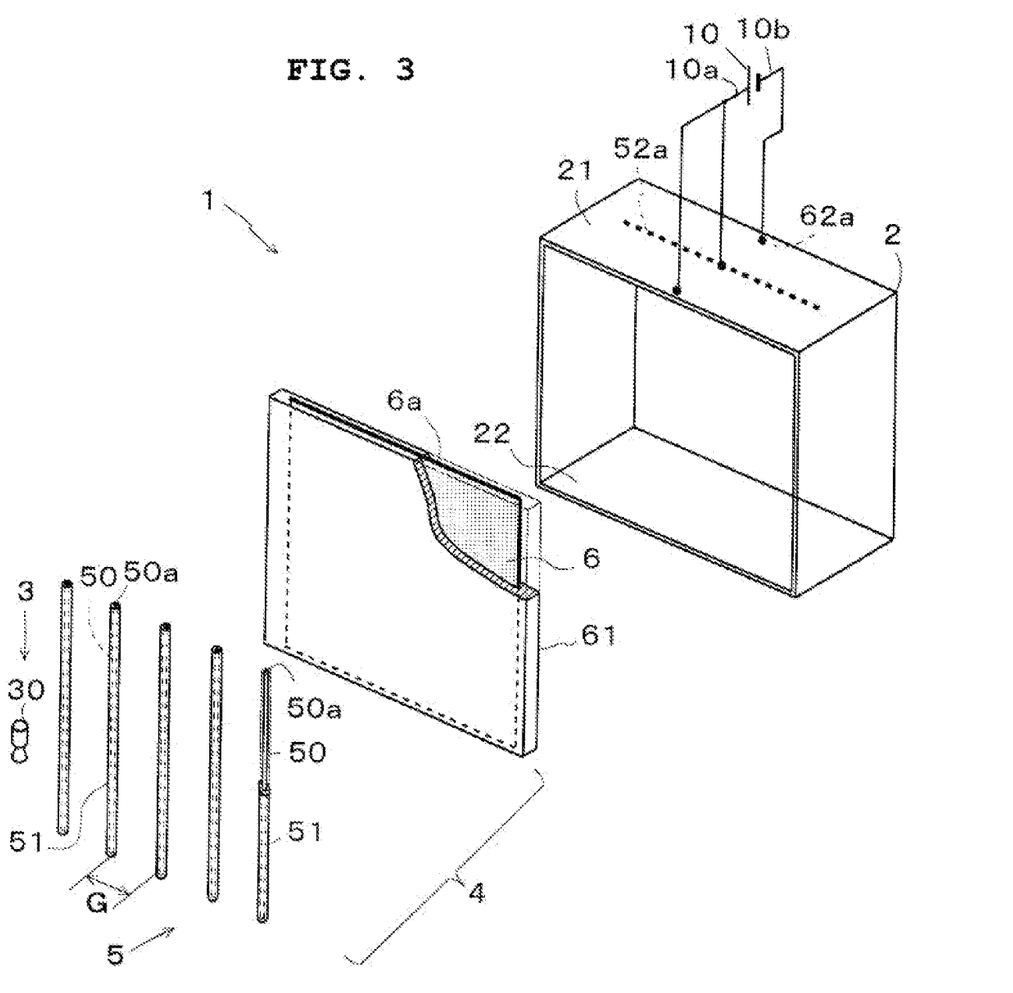
FIG. 3 is an exploded perspective view of the electrostatic precipitator in FIG. 1 showing a partially broken component.

FIG. 1 is a perspective view showing an electrostatic precipitator according to a first embodiment of the present invention, FIG. 2 is a cross-sectional view taken along an arrow A-A in FIG. 1, and FIG. 3 is an exploded perspective view of the electrostatic precipitator in FIG. 1 showing a partially broken component.

As shown in FIG. 1, an electrostatic precipitator 1 of the present embodiment has a structure in which an ionization unit 3 and a dust collection unit 4 are incorporated in a case 2.

The case 2 is an insulating quadrangular frame body opened in front (a front side in FIG. 1) and rear (a rear side in FIG. 1), and the ionization unit 3 is assembled in a front stage of the case 2, and the dust collection unit 4 is assembled from a middle stage to a rear stage of the case 2.

The ionization unit 3 is a unit configured to generate ions, and includes an ionizer 30 and a power source 10.

The ionizer 30 is attached to a center of a front end of a lower surface of an upper frame 21 of the case 2. The ionizer 30 is a direct current ionizer, and has an electrode needle 30a inside as shown in FIG. 2. In the electrode needle 30a, a tip is disposed downward, and a rear end is connected to a positive electrode 10a of the power source 10 that generates a direct current voltage.

That is, a positive direct current voltage from the power source 10 is applied to the electrode needle 30a of the ionizer 30. Accordingly, a corona discharge can be generated at the tip of the electrode needle 30a, and air existing around the electrode needle 30a can be electrically decomposed to generate ions of positive polarity.

A voltage applied to the electrode needle 30a usually needs to be in a range of 3 kV to 6 kV to generate the ions. That is, a direct current power source in the range of 3 kV to 6 kV is used as the power source 10.

A polarity of the voltage applied to the electrode needle 30a is optional, but in the present embodiment, the positive direct current voltage is set to be applied.

That is, a direction of the electrode needle 30a and the voltage of the power source 10 are set such that the ions of positive polarity diffuse in front of the dust collection unit 4 in parallel with a surface of the dust collection unit 4.

The dust collection unit 4 is a unit configured to electrically collect dust to which the ions are attached, and includes a high-voltage electrode 5 in a front stage and a dust collection board 6 in a rear stage.

The high-voltage electrodes 5 of the dust collection unit 4 are a plurality of linear conductors 50 arranged in a rear stage of the ionization unit 3, and are connected to the power source 10.

As shown in FIG. 3, the plurality of linear conductors 50 are arranged side by side and parallel at predetermined intervals in an upright state.

The intervals, that is, intervals G in which the plurality of linear conductors 50 are arranged side by side are gaps for passing the dust to which the ions are attached, and are set within a range of 40 mm to 100 mm.

Each of the plurality of linear conductors 50 is covered with an insulator 51.

It is desirable that such a linear conductor 50 is as thin as possible and has a performance capable of withstanding a high voltage.

For example, the linear conductor 50 is preferably copper, nickel, or an alloy thereof, and the insulator 51 is preferably silicon.

An upper end 50a of such the linear conductor 50 is connected to a band-shaped conductor 52a provided on the lower surface of the upper frame 21 of the case 2, and the band-shaped conductor 52a is connected to the positive electrode 10a of the power source 10.

Accordingly, the positive direct current voltage from the power source 10 is applied to the plurality of linear conductors 50.

That is, as shown in FIG. 2, in the electrostatic precipitator 1 of the present embodiment, the direct current voltages applied to the electrode needle 30a of the ionizer 30 and the plurality of linear conductors 50 are set to the same polarity and the same voltage value.

Accordingly, by setting the direct current voltages applied to the electrode needle 30a of the ionizer 30 and the plurality of linear conductors 50 to the same polarity, the ions generated by the ionizer 30 can be prevented from being directly adsorbed on the dust collection board 6 by the plurality of linear conductors 50 constituting the high-voltage electrode 5, and the ions can be diffused by a repulsive action of the same polarity.

In the present embodiment, the direct current voltages applied to the electrode needle 30a of the ionizer 30 and the plurality of linear conductors 50 are set to the same voltage value, and it is of course possible to set different voltage values if the polarities are the same.

As shown in FIG. 3, the dust collection board 6 of the dust collection unit 4 is a flat plate-shaped conductor disposed in a rear stage of the high-voltage electrode 5, and is connected to the power source 10.

The dust collection board 6 is disposed to be rearward by a predetermined distance from the high-voltage electrode 5 in a state of standing perpendicular to a dust collecting direction (a right direction in FIG. 2).

As shown in FIG. 2, a distance L1 from the electrode needle 30a of the ionizer 30 to the dust collection board 6 is set within a range of 30 mm to 100 mm, and a distance L2 from the high-voltage electrode 5 to the dust collection board 6 is set within a range of 10 mm to 80 mm.

As shown in FIG. 3, such a dust collection board 6 is covered with an insulator 61 separate from the insulator 51 of the linear conductor 50.

The insulator 61 is an insulating resin film such as polyethylene terephthalate (PET). A volume resistivity of the insulator 61 is set in a range of $10^{10}$ Ω·cm to $10^{13}$ Ω·cm, and a thickness is set to about 0.1 mm.

As the dust collection board 6, a conductor such as metal, such as copper foil or aluminum foil, or carbon can be applied.

Accordingly, as shown in FIG. 2, an upper end 6a of the dust collection board 6 coated with the insulator 61 is connected to a terminal 62a provided at the rear of the lower surface of the upper frame 21 of the case 2, and the terminal 62a is connected to a negative electrode 10b of the power source 10.

Accordingly, a negative direct current voltage from the power source 10 is applied to the dust collection board 6.

That is, in the electrostatic precipitator 1 of the present embodiment, a direct current voltage having a polarity opposite to the polarity of the voltage applied to the high-voltage electrode 5 is set to be applied to the dust collection board 6. This voltage value is a voltage value in a range of −500 V to 5 kV.

As described above, when the voltage having the polarity opposite to that of the high-voltage electrode 5 is applied to the dust collection board 6, a strong electric field is generated between the high-voltage electrode 5 and the dust collection board 6, and charged dust that has passed through the intervals G of the high-voltage electrode 5 can be quickly adsorbed to the dust collection board 6 with a strong force.

Next, functions and effects of the electrostatic precipitator 1 of the present embodiment will be described.

Figure 4:
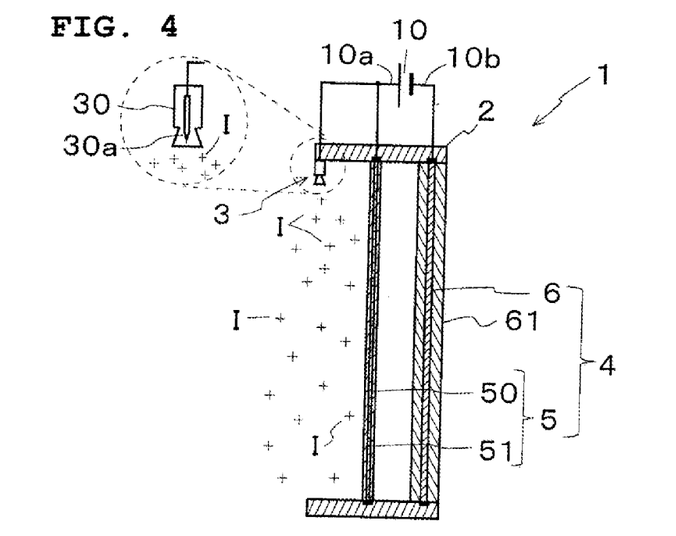
FIG. 4 is a cross-sectional view showing a state of generating ions by an ionization unit 3.
Figure 5:
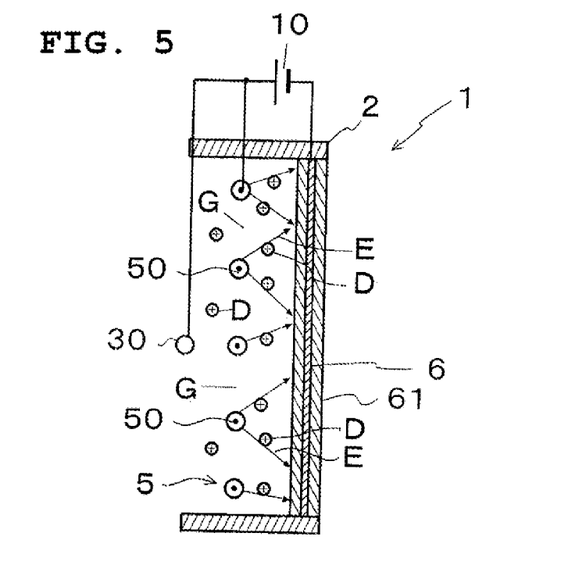
FIG. 5 is a cross-sectional view showing a dust collection state of charged dust from above.

FIG. 4 is a cross-sectional view showing a state of generating the ions by the ionization unit 3, and FIG. 5 is a cross-sectional view showing a dust collection state of the charged dust from above.

In FIG. 2, the positive direct current voltage of the power source 10 is applied to the electrode needle 30a of the ionizer 30 and the linear conductors 50 of the high-voltage electrode 5, and the negative direct current voltage is applied to the dust collection board 6.

Then, by applying the positive direct current voltage to the electrode needle 30a of the ionizer 30, as shown in FIG. 4, ions I of positive polarity are generated at a tip portion of the electrode needle 30a, and a large quantity of the ions I are diffused to the surroundings.

In this case, the ions I are attempting to be drawn into a dust collection board 6 side, the positive direct current voltage having the same polarity as the ions I is applied to the linear conductors 50 of the high-voltage electrode 5, and thus, movement of the ions I to the dust collection board 6 side is prevented by the linear conductors 50 having the same polarity.

That is, since the linear conductors 50 to which the voltage having the same polarity as the ions I are applied are interposed between the ionizer 30 and the dust collection board 6, an electric field is not directly formed between the electrode needle 30a of the ionizer 30 and the dust collection board 6.

Therefore, a large quantity of the ions I are widely diffused in front of the high-voltage electrode 5 without being drawn by the dust collection board 6, and adheres to the dust existing in a wide space in front of the high-voltage electrode 5. That is, presence of the high-voltage electrode 5 to which the voltage having the same polarity as that of the ionizer 30 is applied causes the dust in a wide range to be charged.

As shown in FIG. 5, a strong electric field E directed from the high voltage electrode 5 toward the dust collection board 6 is generated between the linear conductors 50 of the high-voltage electrode 5 and the dust collection board 6, and thus, once positively charged dust D passes through gaps of the intervals G of the high-voltage electrode 5, the charged dust D is rapidly drawn to the dust collection board 6 side by a strong force and is electrically adsorbed on the dust collection board 6.

That is, according to the electrostatic precipitator 1 of the present embodiment, a large quantity of the dust is charged in a wide range, and the charged dust is strongly and quickly collected by the strong electric field between the high-voltage electrode 5 and the dust collection board 6.

In order to demonstrate such a point, an inventor or the like conducted a dust collection capability comparison experiment between the electrostatic precipitator 1 of the present embodiment and an electrostatic precipitator in the prior art in which the high-voltage electrode 5 is removed from the electrostatic precipitator 1.

As a result, in the electrostatic precipitator in the prior art, it was possible to collect only dust in a radius of about 100 mm from the ionizer 30 of the ionization unit 3. Meanwhile, in the electrostatic precipitator 1 of the present embodiment, it was possible to collect dust in a range of 400 mm or more from the ionizer 30.

As a result, the inventor or the like were able to confirm that the electrostatic precipitator 1 of the present embodiment has a very wide dust collection range and has a dust collection capability as compared with the electrostatic precipitator in the prior art.

By the way, if a distance between the ionizer 30 of the ionization unit 3 and the dust collection board 6 is short, a spark discharge may occur and ozone may be generated from the ionizer 30 toward the dust collection board 6.

However, in the electrostatic precipitator 1 of the present embodiment, the plurality of linear conductors 50, which are the high-voltage electrodes 5, are interposed between the ionizer 30 and the dust collection board 6, and moreover, the polarity of the direct current voltage applied to the ionizer 30 and the polarity of the direct current voltage applied to the linear conductors 50 are set to the same polarity, and thus, an electric field is not directly generated between the ionizer 30 and the dust collection board 6. Therefore, almost no spark discharge occurs. Moreover, since the linear conductor 50 of the high-voltage electrode 5 is covered with the insulator 51 and the dust collection board 6 is covered with the insulator 61, the occurrence of the spark discharge can be greatly prevented, and the generation of ozone can be prevented.

In order to demonstrate such a point, the inventor or the like drove the electrostatic precipitator 1 of the present embodiment under conditions of a room temperature of 20° C. and an airflow rate of 20 L/min, and confirm ed that generated ozone was 0.001 ppm or less, which is a measurement limit of an ozone concentration measuring device, and could not be detected.

That is, according to the present embodiment, a device such as an ozone treatment device is not required, and thus, the small and thin electrostatic precipitator 1 having a thickness of 100 mm or less and having a high dust collection range and a high dust collection capability can be provided.

Second Embodiment

Next, a second embodiment will be described.

Figure 6:
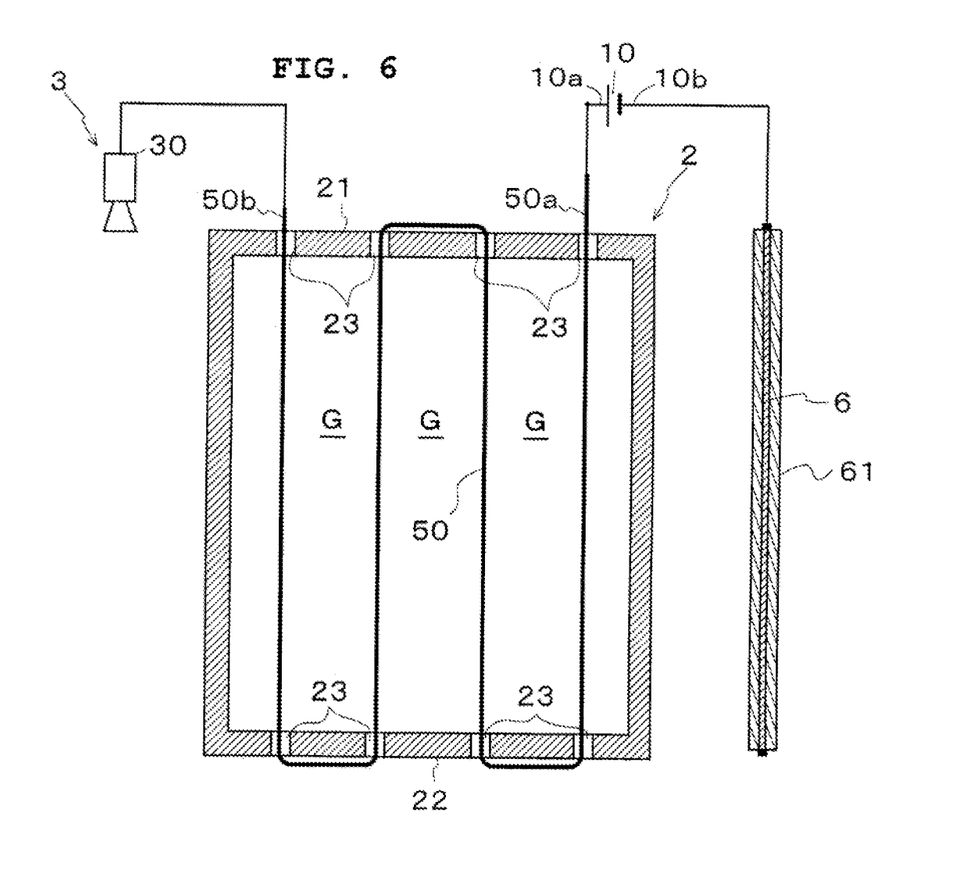
FIG. 6 is an exploded view for illustrating an electrostatic precipitator according to a second embodiment of the present invention.

FIG. 6 is an exploded view for illustrating an electrostatic precipitator according to the second embodiment of the present invention.

In the electrostatic precipitator of the present embodiment, an electrical connection structure of a high-voltage electrode and an electrical connection structure of an ionizer are different from those of the above-described first embodiment.

That is, the above-described first embodiment shows an example of the high-voltage electrode having the structure in which the plurality of linear conductors 50 are connected in parallel to the positive electrode 10a of the power source 10 through the band-shaped conductor 52a, and in the present embodiment, as shown in FIG. 6, the single linear conductor 50 connected to the positive electrode 10a of the power supply 10 is applied as a high-voltage electrode.

Specifically, a plurality of holes 23 are provided in the upper frame 21 and a lower frame 22 of the case 2, and the single linear conductor 50 coated with the insulator 51 (not shown) passes through these holes 23 in a meandering manner like passing a shoelace. Then, by connecting a base end 50a of the linear conductor 50 to the positive electrode 10a of the power source 10, a high-voltage electrode having the same function as the high-voltage electrode of the above-described first embodiment is configured.

In the above-described first embodiment, power supply to the ionizer 30 of the ionization unit 3 is performed by an electric wire from the positive electrode 10a of the power source 10. Meanwhile, in the present embodiment, by connecting an end 50b of the linear conductor 50 to the ionizer 30 of the ionization unit 3, the linear conductor 50 is also used as an electric wire for supplying power to the ionizer 30 of the ionization unit 3.

The electrical structure of the electrostatic precipitator is simplified by using such an electrical connection structure.

Since other configurations, functions, and effects are the same as those in the first embodiment, descriptions thereof will be omitted.

The present invention is not limited to the above-described embodiments, and various modifications and changes can be made within the scope of the gist of the invention.

For example, in the above embodiment, the high-voltage electrode is formed by the plurality of parallel linear conductors 50 each coated with the insulator 51 as shown in FIG. 3, but the high-voltage electrode is not limited thereto.

Figure 7:
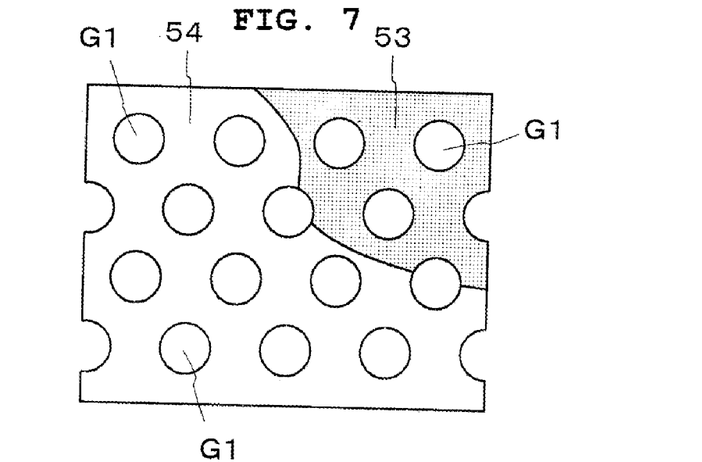
FIG. 7 is a plan view showing a modification of a high-voltage electrode.

For example, as shown in FIG. 7, a flat plate-shaped electrode 53, which has a plurality of holes G1 as gaps, coated with an insulator 54 can also be applied as a high-voltage electrode.

Figure 8:
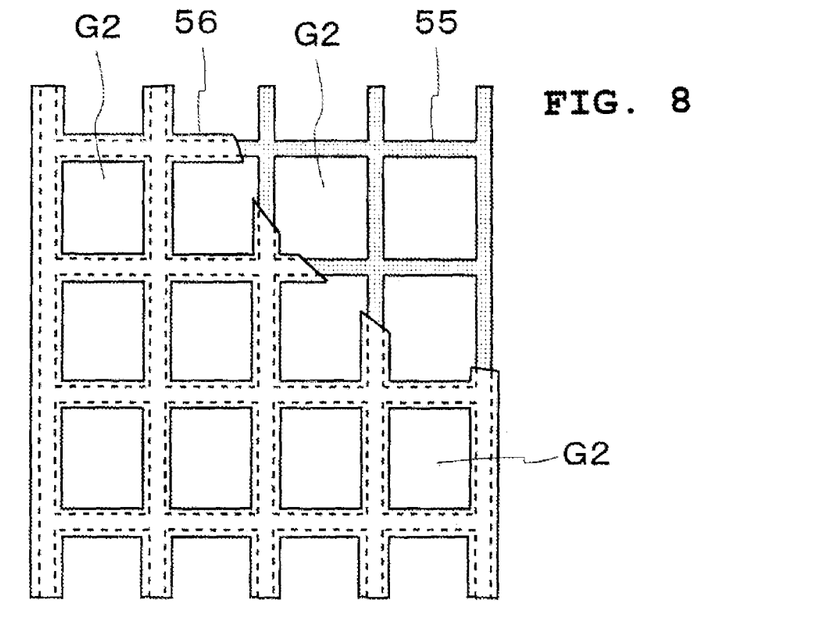
FIG. 8 is a plan view showing another modification of the high-voltage electrode.

As shown in FIG. 8, a mesh-shaped electrode 55, which has a plurality of gaps G2, coated with an insulator 56 can also be applied as a high-voltage electrode.

Further, in the above embodiments, in order to facilitate the understanding of the corona discharge, the ionizer 30 having one electrode needle 30a inside is exemplified as the ionizer of the ionization unit 3, but the ionizer applicable to the electrostatic precipitator is not limited thereto. For example, a so-called "carbon brush ionizer" in which electrode needles made of carbon conductive fibers are bundled in a brush shape can also be applied as the ionizer for the electrostatic precipitator.

Description of the reference numerals: 1 electrostatic precipitator; 2 case; 3 ionization unit; 4 dust collection unit; 5 high-voltage electrode; 6 dust collection board; 6a upper end; 10 power source; 10a positive electrode; 10b negative electrode; 21 upper frame; 22 lower frame; 23 hole; 30 ionizer; 30a electrode needle; 50 linear conductor; 50a upper end (base end); 50b end; 51, 54, 56, 61 insulator; 52a band-shaped conductor; 53, 55 electrode; 62a terminal; E electric field; G, G2 interval; G1 hole; I ion; D charged dust.

The invention claimed is:

1. An electrostatic precipitator comprising:
an ionization unit configured to generate ions; and
a dust collection unit configured to electrically collect dust to which the ions are attached,
wherein the ionization unit includes an ionizer that applies a predetermined voltage to an electrode needle to cause a corona discharge to generate the ions having the same polarity as a polarity of the applied voltage,
wherein the dust collection unit includes:
a high-voltage electrode disposed at a rear stage of the ionization unit, having a plurality of gaps for passing the dust to which the ions are attached, and applied with a predetermined voltage; and a dust collection board disposed at a rear stage of the high-voltage electrode and applied with a voltage having a polarity opposite to a polarity of the voltage applied to the high-voltage electrode to electrically adsorb the dust to which the ions are attached,
wherein a polarity of the voltage applied to the electrode needle of the ionization unit and the polarity of the voltage applied to the high-voltage electrode are set to the same polarity,
wherein the high-voltage electrode of the dust collection unit is formed by a plurality of linear conductors arranged in parallel at a predetermined interval and each coated with an insulator,
wherein the dust collection board of the dust collection unit is provided with a conductor and an insulating resin film coating the conductor, and the dust collection board is a flat plate including a face closed in a dust collecting direction, and
wherein the dust collection board is disposed in such a manner that the face and a longitudinal direction of the linear conductors cross the dust collecting direction.

2. The electrostatic precipitator according to claim 1,
wherein a volume resistivity of the resin film is set in a range of $10^{10}$ Ω·cm to $10^{13}$ Ω·cm, a thickness thereof is set to about 0.1 mm, and the distance from the ionization unit to the dust collection board of the dust collection unit is set to 100 mm or less.

3. The electrostatic precipitator according to claim 1,
wherein a distance between the plurality of linear conductors forming the high-voltage electrode is set within a range of 40 mm to 100 mm,
wherein a distance between the high-voltage electrode formed by the plurality of linear conductors and the dust collection board is set within a range of 10 mm to 80 mm, and
wherein a distance from the electrode needle of the ionization unit to the dust collection board of the dust collection unit is set within a range of 30 mm to 100 mm.

4. The electrostatic precipitator according to claim 1,
wherein the ionizer is a direct current ionizer that generates ions by applying a direct current voltage, and
wherein the voltages applied to the high-voltage electrode and the dust collection board are direct current voltages having opposite polarities.

5. The electrostatic precipitator according to claim 2,
wherein a distance between the plurality of linear conductors forming the high-voltage electrode is set within a range of 40 mm to 100 mm,
wherein a distance between the high-voltage electrode formed by the plurality of linear conductors and the dust collection board is set within a range of 10 mm to 80 mm, and
wherein a distance from the electrode needle of the ionization unit to the dust collection board of the dust collection unit is set within a range of 30 mm to 100 mm.

6. The electrostatic precipitator according to claim 2,
wherein the ionizer is a direct current ionizer that generates ions by applying a direct current voltage, and
wherein the voltages applied to the high-voltage electrode and the dust collection board are direct current voltages having opposite polarities.

7. The electrostatic precipitator according to claim 3,
wherein the ionizer is a direct current ionizer that generates ions by applying a direct current voltage, and
wherein the voltages applied to the high-voltage electrode and the dust collection board are direct current voltages having opposite polarities.

8. The electrostatic precipitator according to claim 5,
wherein the ionizer is a direct current ionizer that generates ions by applying a direct current voltage, and
wherein the voltages applied to the high-voltage electrode and the dust collection board are direct current voltages having opposite polarities.

9. The electrostatic precipitator according to claim 4,
wherein the ionizer is a direct current ionizer that generates ions by applying a direct current voltage, and wherein the voltages applied to the high-voltage electrode and the dust collection board are direct current voltages having opposite polarities.

10. An electrostatic precipitator according to claim 1, wherein an axial direction of the ionizer coincides with the longitudinal direction of the linear conductors.

11. An electrostatic precipitator according to claim 2, wherein an axial direction of the ionizer coincides with the longitudinal direction of the linear conductors.

12. An electrostatic precipitator according to claim 3, wherein an axial direction of the ionizer coincides with the longitudinal direction of the linear conductors.

13. An electrostatic precipitator according to claim 4, wherein an axial direction of the ionizer coincides with the longitudinal direction of the linear conductors.

14. An electrostatic precipitator according to claim 5, wherein an axial direction of the ionizer coincides with the longitudinal direction of the linear conductors.

15. An electrostatic precipitator according to claim 6, wherein an axial direction of the ionizer coincides with the longitudinal direction of the linear conductors.

16. An electrostatic precipitator according to claim 7, wherein an axial direction of the ionizer coincides with the longitudinal direction of the linear conductors.

17. An electrostatic precipitator according to claim 8, wherein an axial direction of the ionizer coincides with the longitudinal direction of the linear conductors.

18. An electrostatic precipitator according to claim 9, wherein an axial direction of the ionizer coincides with the longitudinal direction of the linear conductors.

\* \* \* \* \*